(12) United States Patent
Chang et al.

(10) Patent No.: US 6,847,757 B2
(45) Date of Patent: Jan. 25, 2005

(54) RECONFIGURABLE OPTICAL ADD/DROP MULTIPLEXER

(75) Inventors: Sean Chang, Tao Yuan (TW); Hawk Chen, Taipei County (TW)

(73) Assignee: Delta Electronics, Inc. (TW)

( * ) Notice: Subject to any disclaimer, the term of this patent is extended or adjusted under 35 U.S.C. 154(b) by 136 days.

(21) Appl. No.: 10/304,782

(22) Filed: Nov. 25, 2002

(65) Prior Publication Data

US 2003/0123790 A1 Jul. 3, 2003

(30) Foreign Application Priority Data

Dec. 31, 2001 (TW) ........................................ 90133402 A

(51) Int. Cl.⁷ .............................................. G02B 6/28
(52) U.S. Cl. ...................................................... 385/24
(58) Field of Search ...................................... 385/16–24

(56) References Cited

U.S. PATENT DOCUMENTS 6,625,346 B2 * 9/2003 Wilde ........................... 385/24
6,671,437 B2 * 12/2003 Margalit ....................... 385/40

* cited by examiner

Primary Examiner—Michael G. Lee
Assistant Examiner—Jamara A. Franklin
(74) Attorney, Agent, or Firm—Martine & Penilla, LLP

(57) ABSTRACT

A reconfigurable optical add/drop multiplexer includes first and second input terminals, first and second output terminals, an optical device and a switching device. The first input terminal receives a multi-wavelength optical signal including a to-be-dropped optical signal. The second input terminal receives a to-be-added optical signal having a wavelength that is the same as that of the to-be-dropped optical signal. The optical device has a reflective region and a filter region, and includes a first reflector and a filter. The filter is disposed in the filter region to separate the to-be-dropped optical signal from the multi-wavelength optical signal. The switching device switches the multi-wavelength optical signal and the to-be-added optical signal to the reflective region or the filter region.

24 Claims, 9 Drawing Sheets

RECONFIGURABLE OPTICAL ADD/DROP MULTIPLEXER

BACKGROUND OF THE INVENTION

1. Field of the invention

The invention relates to an optical add/drop multiplexer, and more specifically, to a reconfigurable optical add/drop multiplexer (ROADM).

2. Description of the Related Art

In the optical network, an optical add/drop multiplexer (OADM) is used to drop an optical signal with a specific wavelength from a multi-wavelength optical signal, and to add another optical signal with the same wavelength to the multi-wavelength optical signal. For example, the optical add/drop multiplexer may drop an optical signal with a specific wavelength from a backbone of an optical fiber network to a local area network (LAN), and may add another optical signal with the same wavelength from the LAN to the backbone. Consequently, the signal transmission architecture of the overall optical fiber network is more flexible.

Among the optical add/drop multiplexers, a reconfigurable optical add/drop multiplexer (ROADM) may decide whether or not to add and drop optical signals according to an external instruction, and may tune the wavelengths of the to-be-added and to-be-dropped optical signals. In the prior art, a reconfigurable optical add/drop multiplexer receives a multi-wavelength optical signal, and then divides the received multi-wavelength optical signal into multiple optical signals having multiple specific wavelengths. Subsequently, optical signals with different wavelengths are transmitted in different waveguide elements which are connected to a 2×2 optical switch that is used to switch the to-be-dropped optical signal. However, the drawback of this kind of tunable reconfigurable optical add/drop multiplexer resides in its complicated structure. Thus, multiple filters and optical switches have to be used in order to drop the optical signals with specific wavelengths, thereby increasing the cost and the difficulties of assembly.

In another tunable ROADM according to the prior art, multiple Bragg gratings are used to drop optical signals with different specific wavelengths. By switching between the Bragg gratings having different periods, the tunable ROADM may tune the to-be-dropped and to-be-added wavelengths. However, in addition to the optical switches, the tunable ROADM still has to use an optical circulator to separate the optical signals inputted to the Bragg gratings from the optical signals reflected from the Bragg gratings. Therefore, this method does not reduce the cost or the difficulties of assembly.

SUMMARY OF THE INVENTION

In view of the above-mentioned problems, the invention provides a reconfigurable optical add/drop multiplexer including a first input terminal, a second input terminal, a first output terminal, a second output terminal, an optical device and a switching device. The first input terminal receives a multi-wavelength optical signal including a to-be-dropped optical signal. The second input terminal receives a to-be-added optical signal having a wavelength that is the same as that of the to-be-dropped optical signal. The optical device has a reflective region and a filter region, and includes a first reflector and a filter. The filter is disposed in the filter region and is capable of separating the to-be-dropped optical signal from the multi-wavelength optical signal. The switching device switches the multi-wavelength optical signal and the to-be-added optical signal to one of the reflective region and the filter region. When traveling to the reflective region, at least one of the multi-wavelength optical signal and the to-be-added optical signal travels to the first reflector and is reflected to the first output terminal, and the other one of the multi-wavelength optical signal and the to-be-added optical signal is reflected to the second output terminal. When traveling to the filter region, the multi-wavelength optical signal travels to the filter, and the filter separates the to-be-dropped optical signal from the multi-wavelength optical signal. Then, the to-be-dropped optical signal is output from one of the first output terminal and the second output terminal. Meanwhile, the multi-wavelength optical signal except for the to-be-dropped optical signal is output, together with the to-be-added optical signal, from the other one of the first output terminal and the second output terminal.

The switching device may be a linear driving mechanism capable of moving the optical device. The switching device may switch the multi-wavelength optical signal and the to-be-added optical signal to the reflective region or filter region by changing a relative position between the optical device and the first input terminal, the second input terminal, the first output terminal as well as the second output terminal.

The switching device may also include a rotatable flat glass, which is disposed between the optical device and the first input terminal, the second input terminal, the first output terminal as well as the second output terminal. The rotatable flat glass switches the multi-wavelength optical signal and the to-be-added optical signal to one of the reflective region and the filter region by changing the refraction offset of the multi-wavelength optical signal and the to-be-added optical signal.

The optical device may further include a second reflector disposed in the reflective region. When the multi-wavelength optical signal and the to-be-added optical signal travel to the reflective region, one of the multi-wavelength optical signal and the to-be-added optical signal travels to the first reflector and is reflected to the second output terminal. Meanwhile, the other one of the multi-wavelength optical signal and to-be-added optical signal travels to the second reflector and is reflected to the second output terminal.

The optical device may include a flat glass having a first optical plane and a second optical plane. The first reflector is coated on or attached to the first optical plane of the flat glass, while the filter is coated on or attached to the second optical plane of the flat glass.

The first input terminal, second input terminal, first output terminal and second output terminal may be disposed in parallel. At this time, a third reflector may be provided in the reconfigurable optical add/drop multiplexer so as to reflect the multi-wavelength optical signal from the first input terminal to the second reflector or filter, and to reflect the to-be-added optical signal from the second input terminal to the first reflector.

DETAILED DESCRIPTION OF THE PREFERRED EMBODIMENTS

Figure 1B:
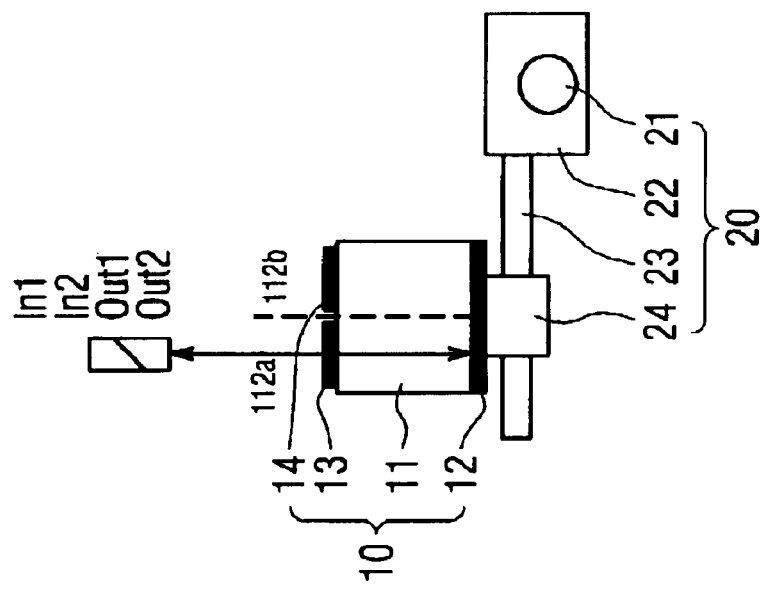
FIGS. 1A to 1E are schematic illustrations each showing the architecture of a reconfigurable optical add/drop multiplexer in accordance with a first embodiment of the invention.

The reconfigurable optical add/drop multiplexer in accordance with the preferred embodiments of the invention will be described with reference to the accompanying drawings, wherein the same reference numbers denote the same elements.

First Embodiment

Referring to FIGS. 1A to 1E, a reconfigurable optical add/drop multiplexer in accordance with a first embodiment of the invention includes a first input terminal In1, a second input terminal In2, a first output terminal Out1, a second output terminal Out2, an optical device 10 and a switching device 20. The optical device 10 includes a flat glass 11, a first reflector 12, a second reflector 13 and a filter 14.

The first input terminal In1 receives a multi-wavelength optical signal having wavelengths of $\lambda 1$ to $\lambda n$, wherein the optical signal with the wavelength of $\lambda 1$ are the to-be-dropped optical signal. The second input terminal In2 receives a to-be-added optical signal $\lambda 1'$ having the wavelength of $\lambda 1$.

Figure 1A:
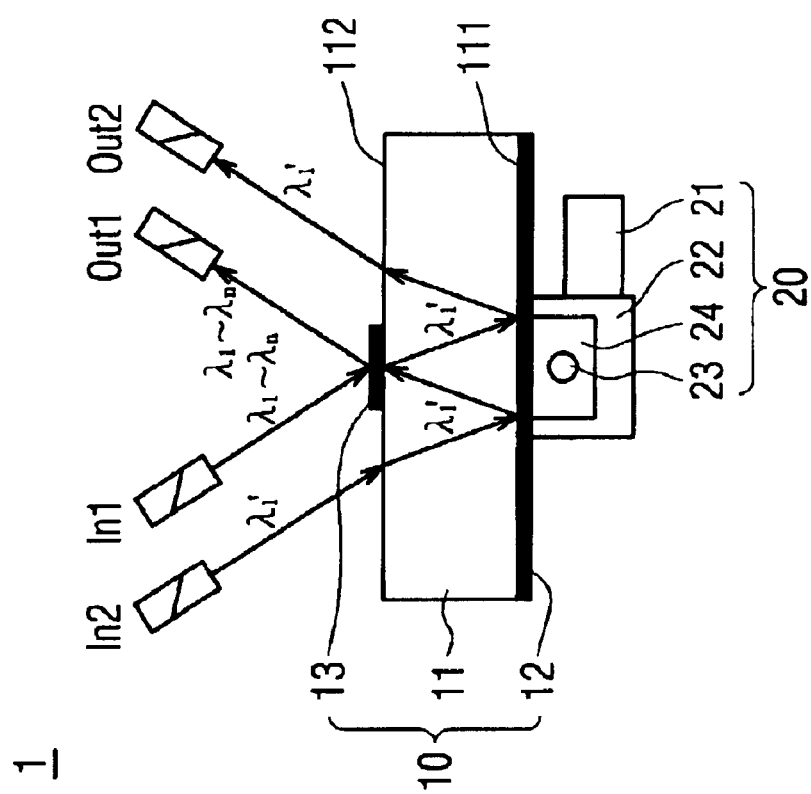
Figure 1C:
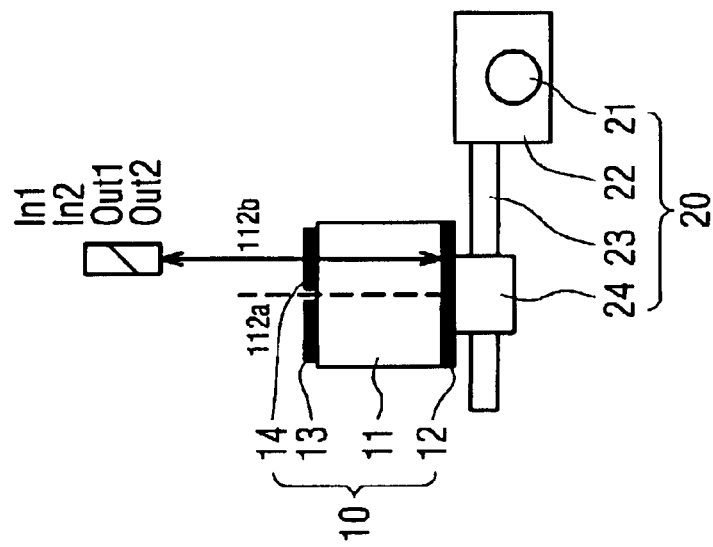
Figure 1D:
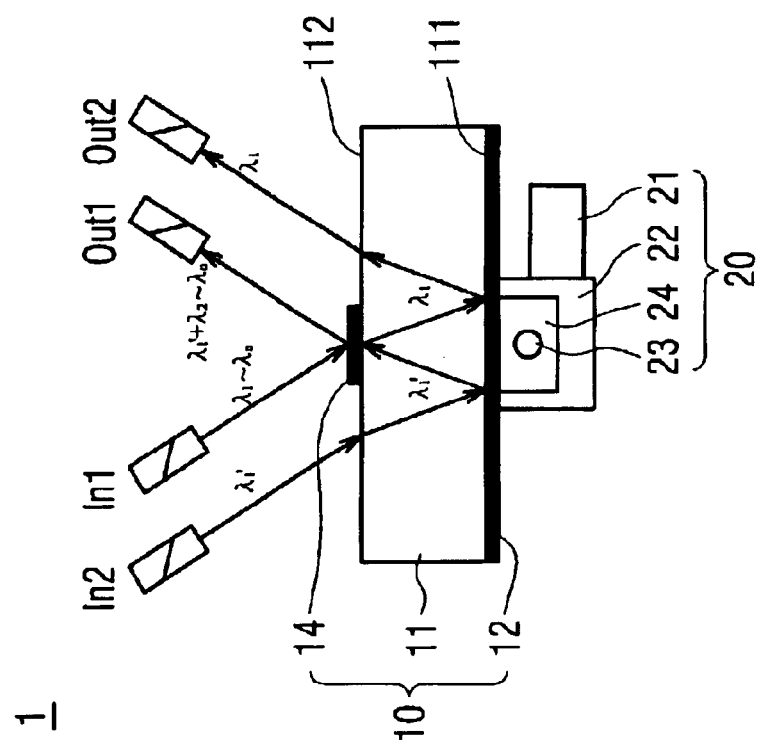
Figure 1E:
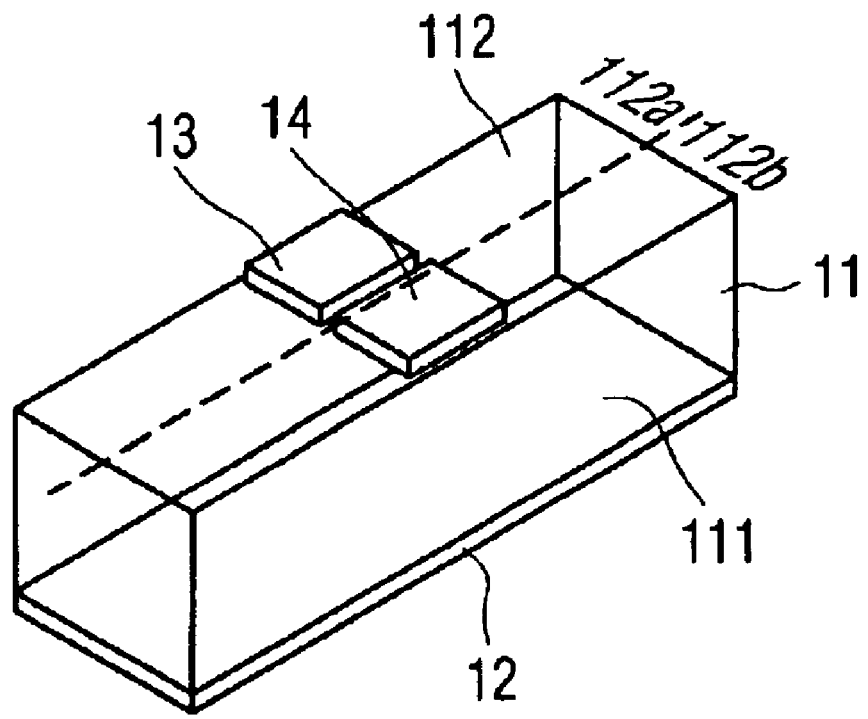

Referring to FIG. 1E, in this embodiment, the flat glass 11 includes a first optical plane 111 and a second optical plane 112 parallel to the first optical plane 111. The second optical plane 112 may further include a reflective region 112a and a filter region 112b. The first reflector 12 may be a reflective film coated on or attached to the first optical plane 111 and capable of providing the total reflection for broadband optical signals. The second reflector 13 is optically attached to or coated on a specific position in the reflective region 112a, and may be a reflective film capable of providing the total reflection for broadband optical signals. The filter 14 also may be a filter film attached to or coated on specific positions in the filter region 112b.

In this embodiment, the switching device 20 may be any linear driving mechanism capable of changing the relative position between the optical device 10 and the input/output terminals. For example, the switching device 20 may be a combination of a conventional stepping motor 21, gear box 22, lead screw 23 and nut 24, as shown in FIGS. 1A to 1D. Since this technology and its equivalents are well known to those skilled in the art, descriptions thereof are omitted.

FIGS. 1A and 1B show the condition when the multi-wavelength optical signal $\lambda 1$ to $\lambda n$ and the to-be-added optical signal $\lambda 1'$ travel to the reflective region 112a. When the optical signals reach the reflective region 112a, the multi-wavelength optical signal $\lambda 1$ to $\lambda n$ is reflected from the second reflector 13 to the first output terminal Out1. Meanwhile, the to-be-added optical signal $\lambda 1'$ travels to the flat glass 11, and then sequentially reflected by the first reflector 12, second reflector 13 and first reflector 12 in the flat glass 11. Next, the signal $\lambda 1'$ passes through the flat glass 11 and travels to the second output terminal Out2.

FIGS. 1C and 1D show the condition when the multi-wavelength optical signal $\lambda 1$ to $\lambda n$ and the to-be-added optical signal $\lambda 1'$ travel to the filter region 112b. In this embodiment, the filter 14 transmits the optical signal with a wavelength of $\lambda 1$. Thus, when the multi-wavelength optical signal $\lambda 1$ to $\lambda n$ travels to the filter region 112b, the to-be-dropped optical signal $\lambda 1$ is separated from the multi-wavelength optical signal by the filter 14. After being separated by the filter 14, the to-be-dropped optical signal $\lambda 1$ passes through the flat glass 11, and is reflected from the first reflector 12 to the second output terminal Out2.

After traveling to the filter region 112b, the to-be-added optical signal $\lambda 1'$ travels to the flat glass 11 and is reflected from the first reflector 12 to the filter 14 in the flat glass 11. Since the filter 14 transmits the optical signal with the wavelength of $\lambda 1$, the to-be-added optical signal $\lambda 1'$ passes through the filter 14 and combined with the optical signal $\lambda 2$ to $\lambda n$ reflected from the filter 14 to be output to the first output terminal Out1.

In the embodiment, it should be noted that the wavelengths of to-be-dropped optical signal and the to-be-added optical signal might be other wavelengths, but need not to be the wavelength $\lambda 1$ in the multi-wavelength optical signal. In other words, by providing filters capable of transmitting different wavelengths, the reconfigurable optical add/drop multiplexer disclosed in this embodiment may drop and add optical signals with different wavelengths. In addition to moving the optical device 10, it is also possible to move the input and output terminals so as to change the position of light incident to the optical device.

Furthermore, the filter 14 may also reflect the optical signal with the wavelength of $\lambda 1$. Accordingly, after the multi-wavelength optical signal $\lambda 1$ to $\lambda n$ and the to-be-added optical signal $\lambda 1'$ travel to the filter region 112b, the to-be-dropped optical signal $\lambda 1$ is output from the first output terminal Out1 while the optical signal $\lambda 2$ to $\lambda n$ and the to-be-added optical signal $\lambda 1'$ are output from the second output terminal Out2. Therefore, the signals of the two networks may be switched.

Second Embodiment

Referring to FIGS. 2A to 2D, in comparison to the first embodiment, all elements in the second embodiment are the same as those in the first embodiment except for the switching device.

In the second embodiment, there is no relative movement between the input/output terminals and the optical device. In other words, instead of using the combination of the stepping motor 21, gear box 22, lead screw 23 and nut 24 as the switching device in this reconfigurable optical add/drop multiplexer, a flat glass 25 is used as the switching device. The flat glass 25 switches light beams to the reflective region or filter region according to the refraction offset after the light travels to the flat glass 25. For example, the flat glass 25 may be a rotatable flat glass.

Figure 2B:
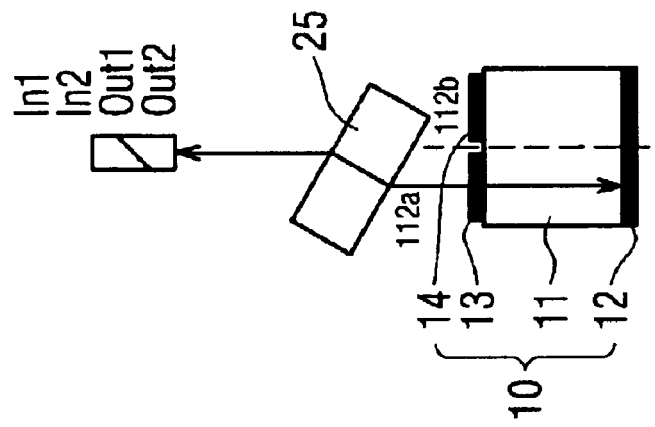
FIGS. 2A to 2D are schematic illustrations each showing the architecture of a reconfigurable optical add/drop multiplexer in accordance with a second embodiment of the invention.
Figure 2A:
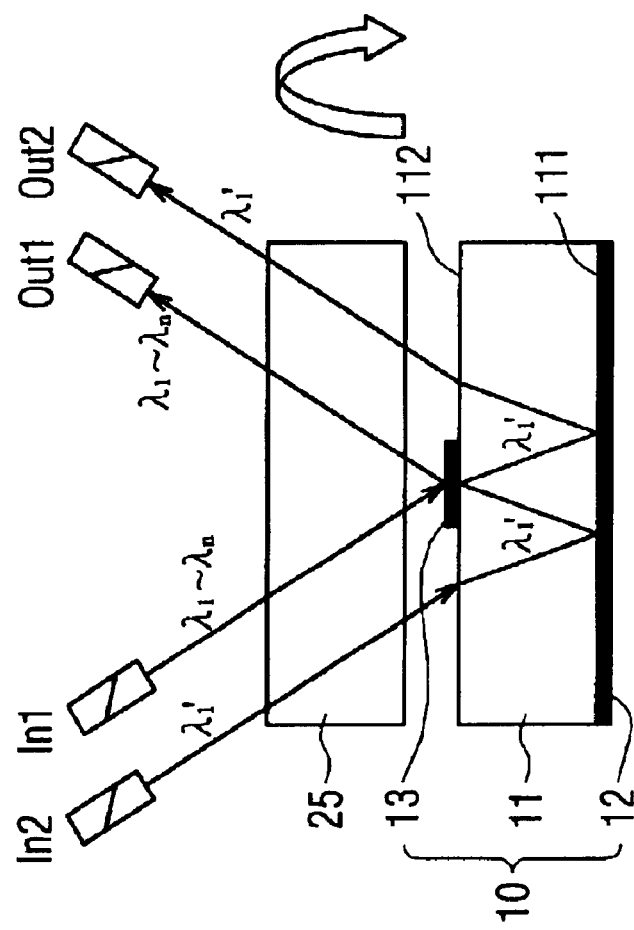

As shown in FIGS. 2A and 2B, when the flat glass 25 is positioned at a first angle, the multi-wavelength optical signal $\lambda 1$ to $\lambda n$ and the to-be-added optical signal $\lambda 1'$ travel to the reflective region 112a after being refracted by the flat glass 25. Similar to the first embodiment, the multi-wavelength optical signal $\lambda 1$ to $\lambda n$ is reflected from the second reflector 13 to the first output terminal Out1, while the to-be-added optical signal $\lambda 1'$ travels to the flat glass 11. Subsequently, the optical signal $\lambda 1'$ is sequentially reflected by the first reflector 12, second reflector 13 and first reflector 12 in the flat glass 11, and then passes through the flat glass 11 and arrives at the second output terminal Out2.

Figure 2D:
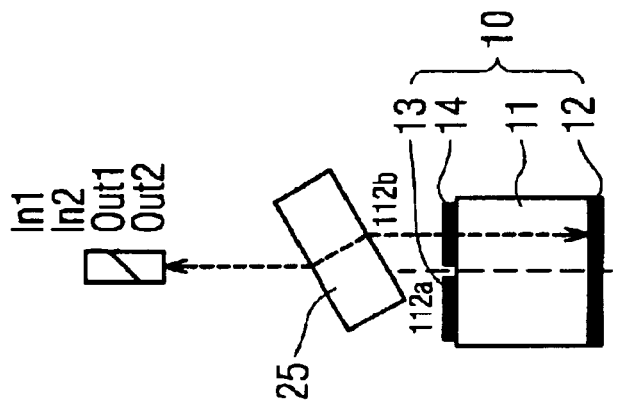
Figure 2C:
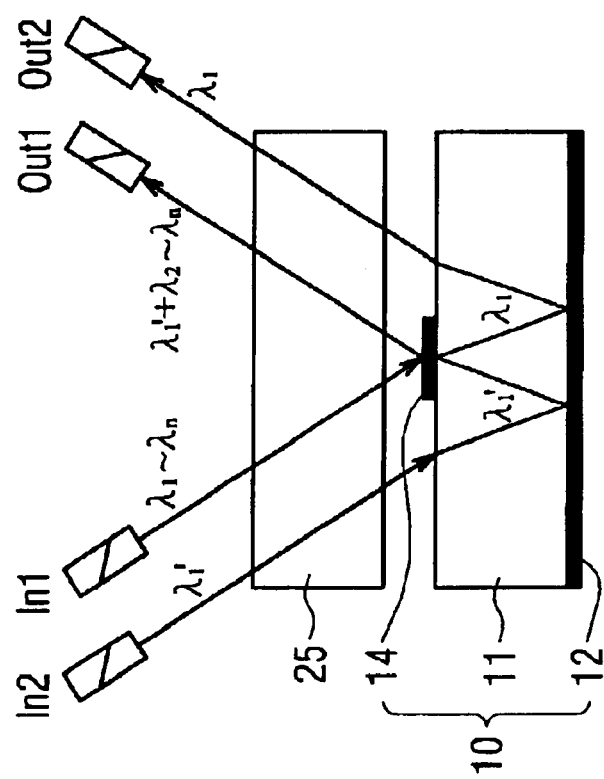

As shown in FIGS. 2C and 2D, when the flat glass 25 is positioned at a second angle, the multi-wavelength optical signal λ1 to λn and the to-be-added optical signal λ1' travel to the filter region 112b after being refracted by the flat glass 25. Similar to the first embodiment, when the multi-wavelength optical signal λ1 and λn travels to the filter region 112b, the to-be-dropped optical signal λ1 is separated from the multi-wavelength optical signal by the filter 14. Then, the to-be-dropped optical signal λ1 passes through the flat glass 11 and is reflected from the first reflector 12 to the second output terminal Out2. The to-be-added optical signal λ1' travels to the flat glass 11 and is reflected from the first reflector 12 to the filter 14 in the flat glass 11. Since the filter 14 may transmit the optical signal with the wavelength of λ1, the to-be-added optical signal λ1' passes through the filter 14 and combined with the optical signal λ2 to λn reflected by the filter 14 to be output to the first output terminal Out1.

Third Embodiment

Figure 3B:
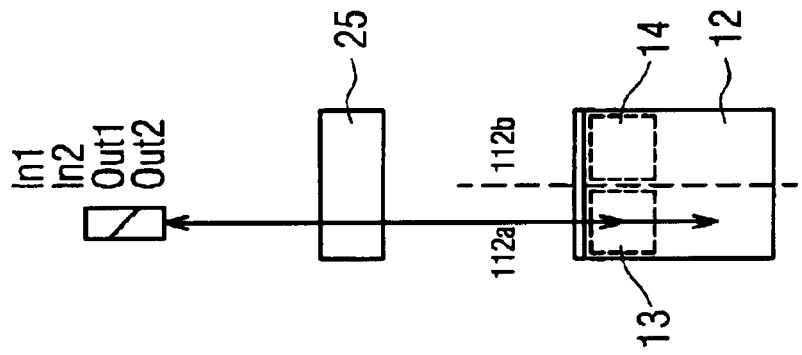
FIGS. 3A to 3D are schematic illustrations each showing the architecture of a reconfigurable optical add/drop multiplexer in accordance with a third embodiment of the invention.
Figure 3A:
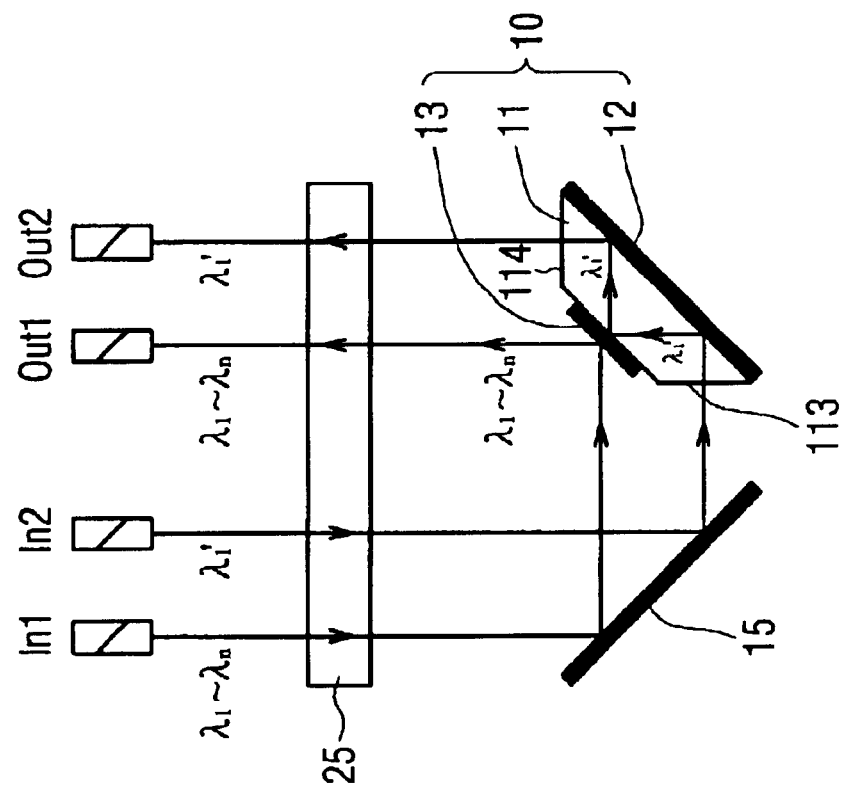

As shown in FIGS. 3A to 3D, in the third embodiment, each of the input and output terminals are arranged parallel to each other, the optical device 10 are inclined with respect to the flat glass 25. That is, in the condition as shown in FIG. 3A, the flat glass 11 and the flat glass 25 are not parallel to each other.

The reconfigurable optical add/drop multiplexer of the third embodiment further includes a third reflector 15, which may be a reflection mirror. The third reflector 15 reflects the multi-wavelength optical signal λ1 to λn coming from the first input terminal In1 as well as the to-be-added optical signal λ1' coming from the second input terminal In2 and passing through the flat glass 25.

As shown in FIGS. 3A and 3B, when the flat glass 25 refracts the multi-wavelength optical signal λ1 to λn and the to-be-added optical signal λ1' toward the reflective region 112a, the multi-wavelength optical signal λ1 to λn and the to-be-added optical signal λ1' will first travel to the third reflector 15. The third reflector 15 reflects the multi-wavelength optical signal λ1 to λn toward the second reflector 13 of the optical device 10, and reflects the to-be-added optical signal λ1' toward the first reflector 12 of the optical device 10. Finally, the multi-wavelength optical signal λ1 to λn is reflected from the second reflector 13 to the first output terminal Out1. After traveling to the flat glass 11, the to-be-added optical signal λ1' is sequentially reflected by the first reflector 12, second reflector 13 and first reflector 12, and passes through the flat glass 11 to be output to the second output terminal Out2.

Figure 3D:
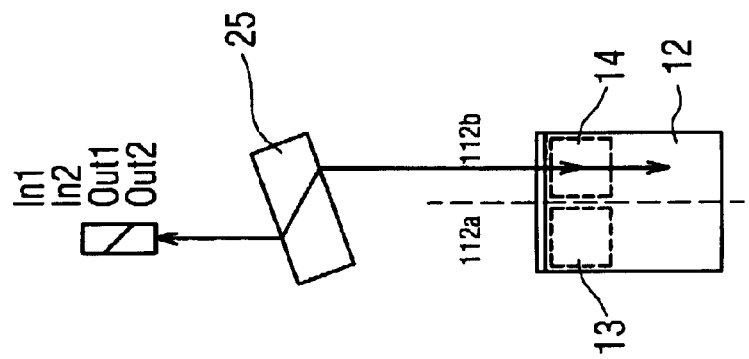
Figure 3C:
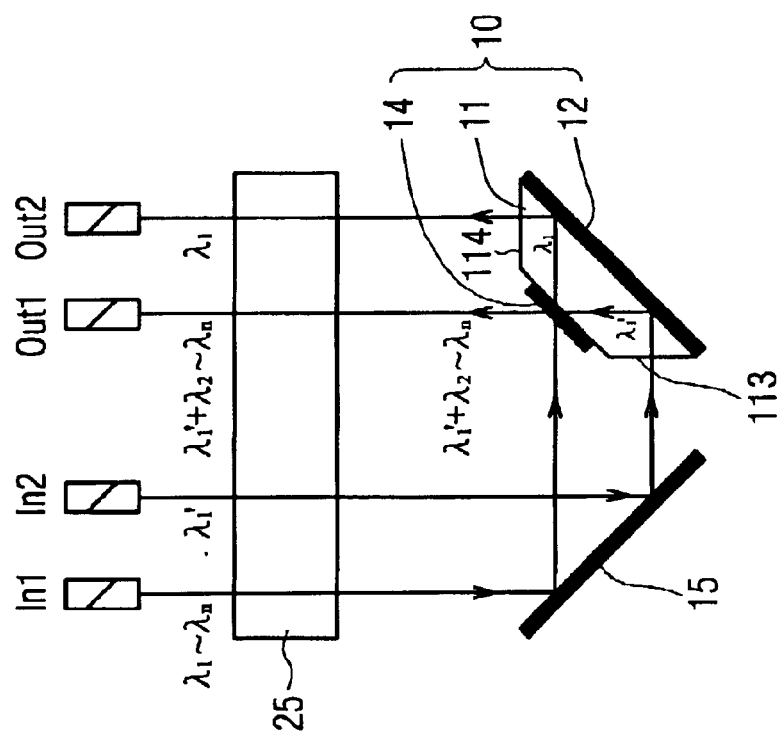

Referring to FIGS. 3C and 3D, when the flat glass 25 refracts the multi-wavelength optical signal λ1 to λn and the to-be-added optical signal λ1' toward the filter region 112b, the multi-wavelength optical signal λ1 to λn and the to-be-added optical signal λ1' also first travel to the third reflector 15. The third reflector 15 reflects the multi-wavelength optical signal λ1 to λn toward the filter 14 of the optical device 10, and reflects the to-be-added optical signal λ1' toward the first reflector 12 of the optical device 10. When the multi-wavelength optical signal λ1 to λn travels to the filter 14, the to-be-dropped optical signal λ1 is separated from the multi-wavelength optical signal, passes through the flat glass 11 and is reflected from the first reflector 12 to the second output terminal Out2. After traveling to the flat glass 11, the to-be-added optical signal λ1' is reflected from the first reflector 12 to the filter 14. Since the filter 14 may transmit the optical signal with the wavelength of λ1, the to-be-added optical signal λ1' passes through the filter 14 and combined together with the optical signal λ2 to λn reflected by the filter 14 to be output to the first output terminal Out1.

In this embodiment, the shape of the flat glass 11 has to be designed corresponding to the traveling direction of each optical signal. However, the spatial position of the flat glass 11 relates to other elements, and those skilled in the art may properly adjust the position of each element according to the requirement of the actual condition. Alternatively, those skilled in the art may change the arrangement and design of each element without departing from the spirit and scope of this invention.

Figure 4:
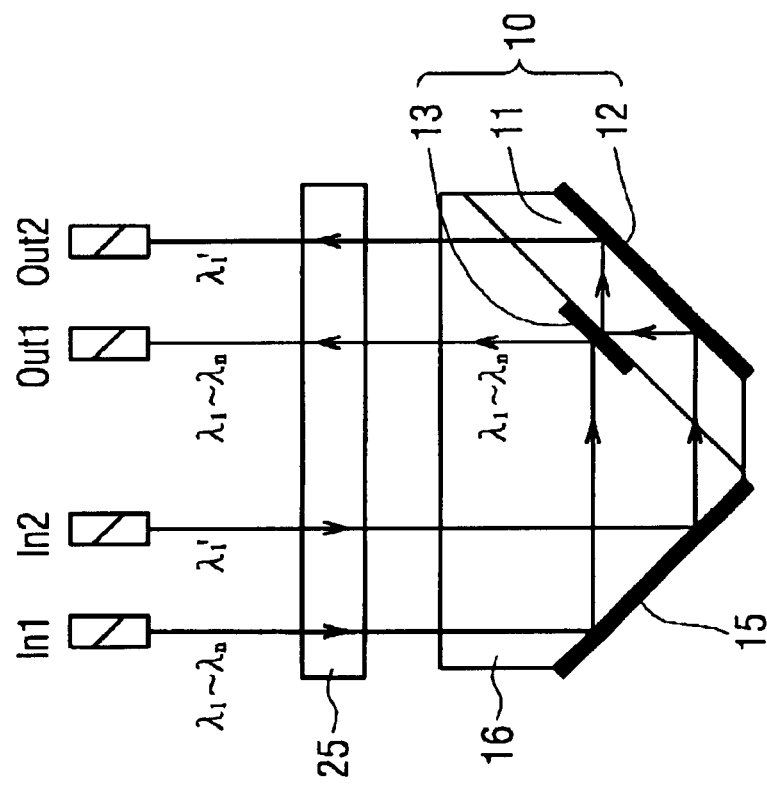
FIG. 4 is a schematic illustration showing another aspect of the reconfigurable optical add/drop multiplexer in accordance with the third embodiment of the invention.
Figure 5B:
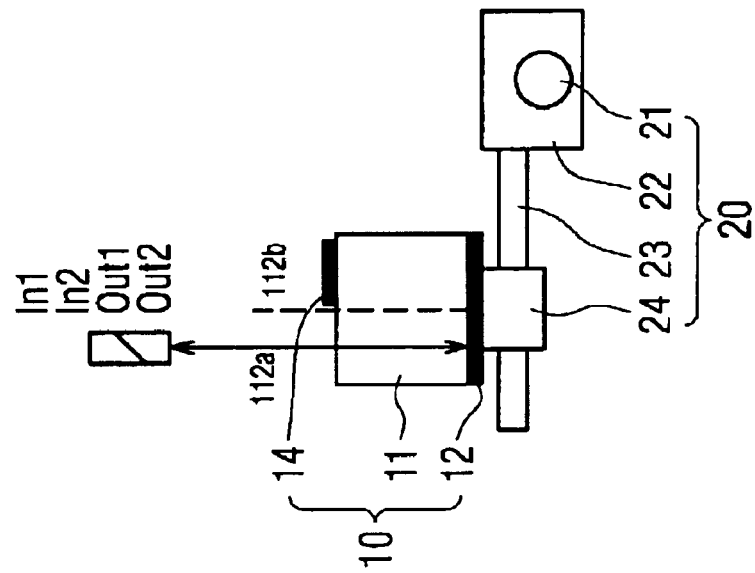
FIGS. 5A to 5B are schematic illustrations each showing another aspect of the reconfigurable optical add/drop multiplexer of the invention.
Figure 5A:
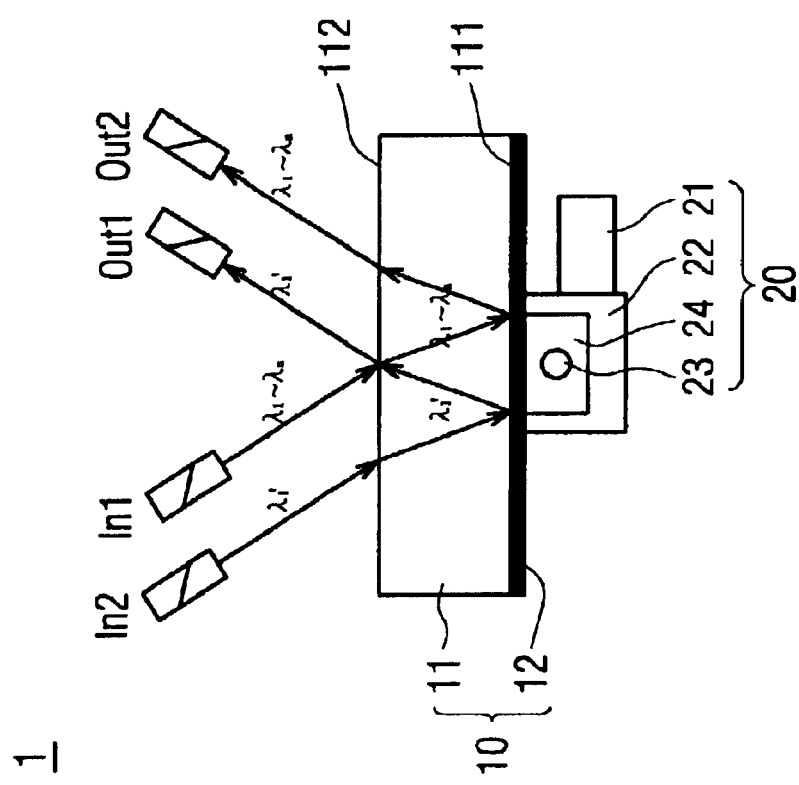

For instance, FIG. 4 is a schematic illustration showing the condition after a prism 16 with a high transmission rate is added. The third reflector 15 may be a reflective film coated on or attached to the prism 16 with a high transmission rate. The second reflector 13 and the filter 14 (not shown in FIG. 4) may be a reflective film coated between the prism 16 and the flat glass 11.

The architectures of the reconfigurable optical add/drop multiplexer in accordance with the embodiments of the invention have been described. According to the present invention, the reconfigurable optical add/drop multiplexer can switch the add/drop operation for the optical signals using a simple optical mechanism. Therefore, the manufacturing and assembling costs can be greatly reduced.

However, those skilled in the art may make equivalent modifications and changes to the above-mentioned embodiments without departing from the spirit and scope of this invention. For example, compared to FIGS. 1A and 1B, FIGS. 5A and 5B show the condition when the second reflector 13 is omitted. According to this design, when traveling to the first reflective region, the multi-wavelength optical signal λ1 to λn travels to the flat glass 11, and are reflected from the first reflector 12 in the flat glass 11 to the second output terminal Out2. The to-be-added optical signal λ1' travels to the flat glass 11, and is reflected from the first reflector 12 in the flat glass 11 to the first output terminal Out1. When traveling to the filter region, the transmission mechanisms of multi-wavelength optical signals λ1 to λn and the to-be-added optical signal λ1' are the same as that of the first embodiment.

While the invention has been described by way of examples and in terms of preferred embodiments, it is to be understood that the invention is not limited to the disclosed embodiments. To the contrary, it is intended to cover various modifications. Therefore, the scope of the appended claims should be accorded the broadest interpretation so as to encompass all such modifications.

What is claimed is:

1. A reconfigurable optical add/drop multiplexer comprising:
   a first input terminal for receiving a multi-wavelength optical signal including a to-be-dropped optical signal;
   a second input terminal for receiving a to-be-added optical signal having a wavelength that is the same as that of the to-be-dropped optical signal;
   a first output terminal;
   a second output terminal;
   an optical device having a reflective region and a filter region and including a first reflector and a filter, wherein the filter is disposed in the filter region and separates the to-be-dropped optical signal from the multi-wavelength optical signal;
   a switching device for switching the multi-wavelength optical signal and the to-be-added optical signal to one of the reflective region and the filter region, wherein:
   when traveling to the reflective region, at least one of the multi-wavelength optical signal and the to-be-added optical signal travels to the first reflector, and is reflected to the first output terminal, and the other one of the multi-wavelength optical signal and the to-be-added optical signal is reflected to the second output terminal, and when traveling to the filter region, the multi-wavelength optical signal travels to the filter, the filter separates the to-be-dropped optical signal from the multi-wavelength optical signal, and then the to-be-dropped optical signal is output from one of the first output terminal and the second output terminal, while the multi-wavelength optical signal except for the to-be-dropped optical signal is output, together with the to-be-added optical signal, from the other one of the first output terminal and the second output terminal.

2. The reconfigurable optical add/drop multiplexer according to claim 1, wherein the switching device is a linear driving mechanism, which switches the multi-wavelength optical signal and the to-be-added optical signal to one of the reflective region and the filter region by changing a relative position between the optical device and the first input terminal, the second input terminal, the first output terminal as well as the second output terminal.

3. The reconfigurable optical add/drop multiplexer according to claim 2, wherein the switching device is used to drive the optical device to move.

4. The reconfigurable optical add/drop multiplexer according to claim 2, wherein the switching device is used to drive the first input terminal, the second input terminal, the first output terminal and the second output terminal to move.

5. The reconfigurable optical add/drop multiplexer according to claim 1, wherein the switching device includes a rotatable flat glass which is disposed between the optical device and the first input terminal, the second input terminal, the first output terminal as well as the second output terminal, the rotatable flat glass switches the multi-wavelength optical signal and the to-be-added optical signal to one of the reflective region and the filter region by changing a refraction offset between the multi-wavelength optical signal and the to-be-added optical signal.

6. The reconfigurable optical add/drop multiplexer according to claim 1, wherein the optical device further comprises a second reflector disposed in the reflective region, when the multi-wavelength optical signal and the to-be-added optical signal travel to the reflective region, one of the multi-wavelength optical signal and the to-be-added optical signal travels to the first reflector and is reflected to the first output terminal, while the other one of the multi-wavelength optical signal and the to-be-added optical signal travels to the second reflector and is reflected to the second output terminal.

7. The reconfigurable optical add/drop multiplexer according to claim 6, wherein the optical device includes a flat glass having a first optical plane and a second optical plane formed at opposite sides of the flat glass, respectively, the first reflector is coated on or attached to the first optical plane, the filter is coated on or attached to the filter region on the second optical plane, and the second reflector is coated on or attached to the reflective region on the second optical plane.

8. The reconfigurable optical add/drop multiplexer according to claim 1, wherein:

the filter reflects the to-be-dropped optical signal, and transmits the multi-wavelength optical signal except for the to-be-dropped optical signal; and when the multi-wavelength optical signal and the to-be-added optical signal travel to the filter region, the to-be-dropped optical signal is output from the first output terminal, the multi-wavelength optical signal except for the to-be-dropped optical signal is output, together with the to-be-added optical signal, from the second output terminal.

9. The reconfigurable optical add/drop multiplexer according to claim 1, wherein:

the filter transmits the to-be-dropped optical signal and reflects the multi-wavelength optical signal except for the to-be-dropped optical signal; and when the multi-wavelength optical signal and the to-be-added optical signal travel to the filter region, the to-be-dropped optical signal is output from the second output terminal, and the multi-wavelength optical signal except for the to-be-dropped optical signal is output, together with the to-be-added optical signal, from the first output terminal.

10. The reconfigurable optical add/drop multiplexer according to claim 1, further comprising:

a third reflector for reflecting the multi-wavelength optical signal coming from the first input terminal and the to-be-added optical signal coming from the second input terminal to the optical device.

11. The reconfigurable optical add/drop multiplexer according to claim 10, further comprising a prism, wherein the third reflector is coated on or attached to the prism, and the filter are disposed between the prism and the optical device.

12. A reconfigurable optical add/drop multiplexer, comprising:

a first input terminal for receiving a multi-wavelength optical signal including a to-be-dropped optical signal;

a second input terminal for receiving a to-be-added optical signal having a wavelength that is the same as the wavelength of the to-be-dropped optical signal;

a first output terminal;

a second output terminal;

an optical device having a reflective region and a filter region, and including a first reflector, a second reflector, and a filter for separating the to-be-dropped optical signal from the multi-wavelength optical signal; and a switching device for changing a relative position between the optical device and the first input terminal, the second input terminal, the first output terminal and the second output terminal, so as to switch optical paths of the multi-wavelength optical signal and the to-be-added optical signal to one of the reflective region and the filter region of the optical device, wherein when traveling to the reflective region, the multi-wavelength optical signal travels to the second reflector and is reflected from the second reflector to the first output terminal, while the to-be-added optical signal travels to the first reflector and is reflected to the second output terminal;

when traveling to the filter region, the multi-wavelength optical signal travels to the filter while the to-be-added optical signal travels to the first reflector, the filter separates the to-be-dropped optical signal from the multi-wavelength optical signal, and then the to-be-dropped optical signal is output from one of the first output terminal and the second output terminal, while the multi-wavelength optical signal except for the to-be-dropped optical signal is output, together with the to-be-added optical signal, from the other one of the first output terminal and the second output terminal.

13. The reconfigurable optical add/drop multiplexer according to claim 12, wherein the optical device comprises a flat glass, which includes a first optical plane and a second optical plane, the first reflector is coated on or attached to the first optical plane, while the second reflector and the filter is coated on or attached to the second optical plane.

14. The reconfigurable optical add/drop multiplexer according to claim 12, wherein:
the filter reflects the to-be-dropped optical signal, and transmits the multi-wavelength optical signal except for the to-be-dropped optical signal; and
when the multi-wavelength optical signal and the to-be-added optical signal travel to the filter region, the to-be-dropped optical signal is output from the first output terminal, the multi-wavelength optical signal except for the to-be-dropped optical signal is output, together with the to-be-added optical signal, from the second output terminal.

15. The reconfigurable optical add/drop multiplexer according to claim 12, wherein:
the filter transmits the to-be-dropped optical signal and reflects the multi-wavelength optical signal except for the to-be-dropped optical signal; and
when the multi-wavelength optical signal and the to-be-added optical signal travel to the filter region, the to-be-dropped optical signal is output from the second output terminal, and the multi-wavelength optical signal except for the to-be-dropped optical signal is output, together with the to-be-added optical signal, from the first output terminal.

16. The reconfigurable optical add/drop multiplexer according to claim 12, further comprising:
a third reflector for reflecting the multi-wavelength optical signal coming from the first input terminal and the to-be-added optical signal coming from the second input terminal to the optical device.

17. The reconfigurable optical add/drop multiplexer according to claim 16, further comprising a prism, wherein the third reflector is coated on or attached to the prism, and the second reflector and the filter are disposed between the prism and the optical device.

18. A reconfigurable optical add/drop multiplexer, comprising:
a first input terminal for receiving a multi-wavelength optical signal including a to-be-dropped optical signal;
a second input terminal for receiving a to-be-added optical signal having a wavelength that is the same as the wavelength of the to-be-dropped optical signal;
a first output terminal;
a second output terminal;
an optical device including a first reflector, a second reflector, and a filter for separating the to-be-dropped optical signal from the multi-wavelength optical signal; and
a switching device for switching the multi-wavelength optical signal and the to-be-added optical signal to one of a reflective region and a filter region of the optical device by changing a refraction offset of the multi-wavelength optical signal and the to-be-added optical signal, wherein
when traveling to the reflective region, the multi-wavelength optical signal travels to the second reflector and is reflected from the second reflector to the first output terminal, while the to-be-added optical signal travels to the first reflector and is reflected to the second output terminal;
when traveling to the filter region, the multi-wavelength optical signal travels to the filter while the to-be-added optical signal travel to the first reflector, the filter separates the to-be-dropped optical signal from the multi-wavelength optical signal, and then the to-be-dropped optical signal is output from one of the first output terminal and the second output terminal, while the multi-wavelength optical signal except for the to-be-dropped optical signal is output, together with the to-be-added optical signal, from the other one of the first output terminal and the second output terminal.

19. The reconfigurable optical add/drop multiplexer according to claim 18, wherein the switching device includes a rotatable flat glass, which is disposed between the optical device and the first input terminal, the second input terminal, the first output terminal as well as the second output terminal.

20. The reconfigurable optical add/drop multiplexer according to claim 18, wherein the optical device comprises a flat glass, which includes a first optical plane and a second optical plane, the first reflector is coated on or attached to the first optical plane, while the second reflector and the filter is coated on or attached to the second optical plane.

21. The reconfigurable optical add/drop multiplexer according to claim 18, wherein:
the filter reflects the to-be-dropped optical signal, and transmits the multi-wavelength optical signal except for the to-be-dropped optical signal; and
when the multi-wavelength optical signal and the to-be-added optical signal travel to the filter region, the to-be-dropped optical signal is output from the first output terminal, the multi-wavelength optical signal except for the to-be-dropped optical signal is output, together with the to-be-added optical signal, from the second output terminal.

22. The reconfigurable optical add/drop multiplexer according to claim 18, wherein:
the filter transmits the to-be-dropped optical signal and reflects the multi-wavelength optical signal except for the to-be-dropped optical signal; and
when the multi-wavelength optical signal and the to-be-added optical signal travel to the filter region, the to-be-dropped optical signal is output from the second output terminal, and the multi-wavelength optical signal except for the to-be-dropped optical signal is output, together with the to-be-added optical signal, from the first output terminal.

23. The reconfigurable optical add/drop multiplexer according to claim 18, further comprising:
a third reflector for reflecting the multi-wavelength optical signal coming from the first input terminal and the to-be-added optical signal coming from the second input terminal to the optical device.

24. The reconfigurable optical add/drop multiplexer according to claim 23, further comprising a prism, wherein the third reflector is coated on or attached to the prism, and the second reflector and the filter are disposed between the prism and the optical device.

* * * * *